United States Patent Office 3,427,888
Patented Feb. 18, 1969

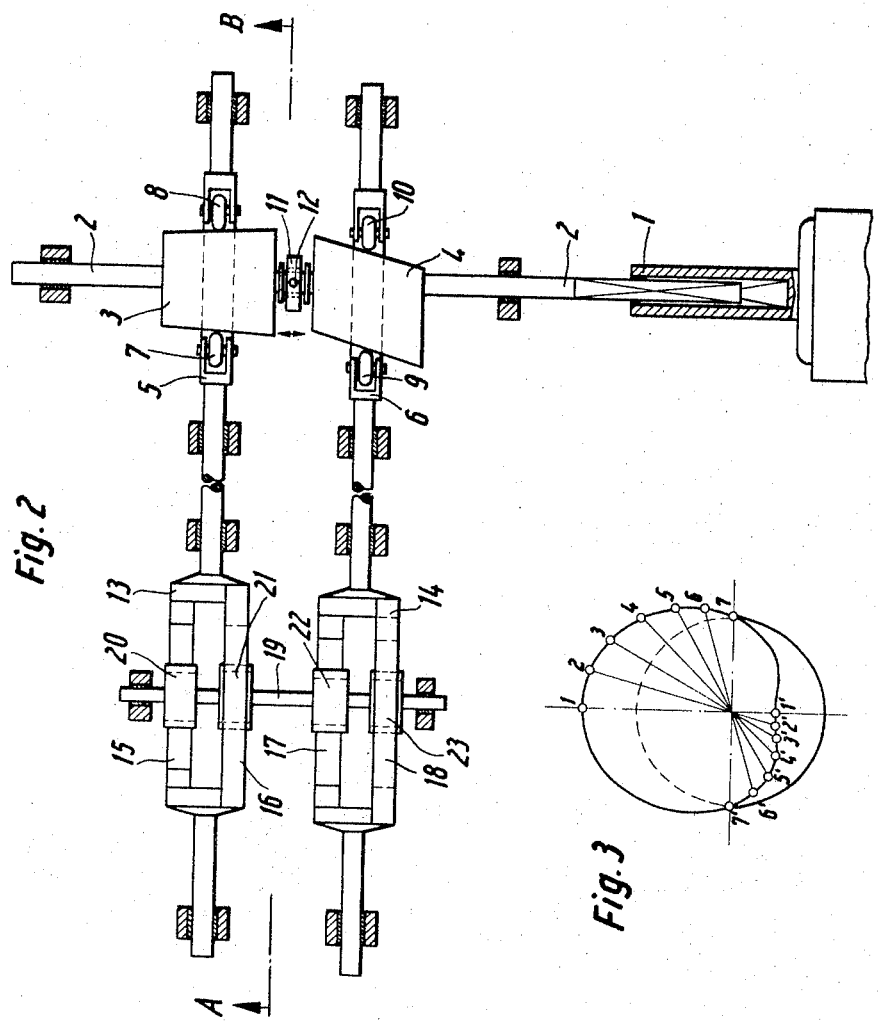

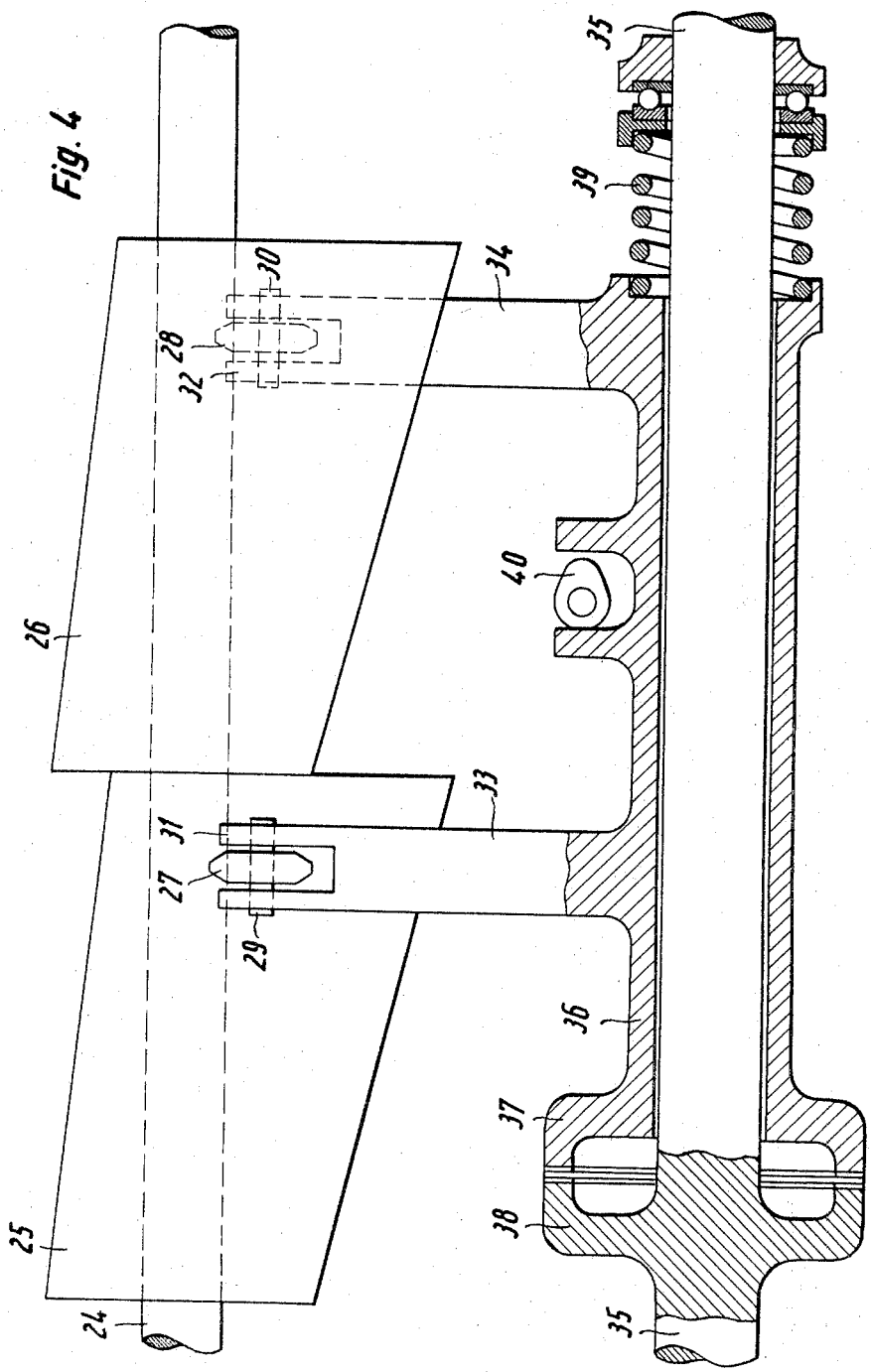

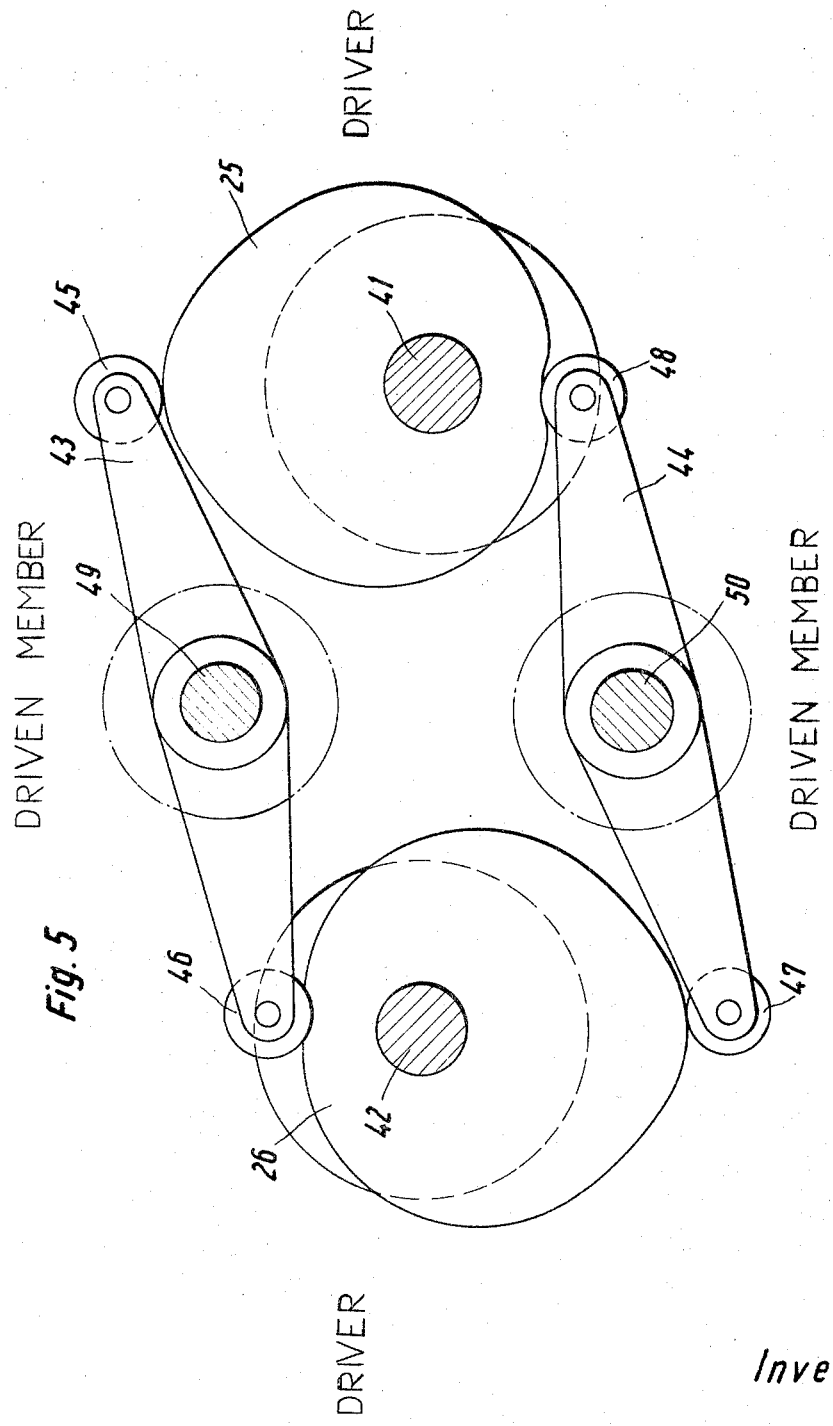

3,427,888
CONTINUOUSLY VARIABLE ANGULAR
SPEED TRANSMISSION
Paul Rheinländer, Wolfenbuttel, Germany, assignor to
Thermo-Industrie G.m.b.H. & Co., Hannover, Germany
Filed Aug. 3, 1967, Ser. No. 658,073
Claims priority, application Germany, Mar. 15, 1967,
T 33,445, T 33,446
U.S. Cl. 74—55
Int. Cl. F16h 25/08
6 Claims

ABSTRACT OF THE DISCLOSURE

Continuously variable angular speed transmission includes driving means, eccentric cam means rotatable by the driving means and having a continuously variable profile in the axial direction thereof, a plurality of roller pairs spaced apart from one another on opposite sides of the cam means and positively constrained to engage and follow the cam means at all times, a separate intermediate member carrying each of the roller pairs, each intermediate member being adapted to perform to-and-fro motion out of phase with the other, driven shaft means, means coupling the intermediate members to the driven shaft means for continuously rotating the driven shaft means by the to-and-fro motion of the intermediate members, and means for adjusting the cam means and the respective roller pairs relatively to one another in the axial direction of the cam means so as to vary the form of the to-and-fro motion of the respective intermediate member and, accordingly, the ratio of the angular speed of the driven shaft means relatively to the angular speed of the driving means.

---

The invention relates to continuously variable transmissions, for example for driving control apparatus, and of the kind in which a driving shaft rotating at constant speed drives a driven shaft to rotate at constant speed through an intermediate member which is moved to and fro (with a reciprocating or oscillating motion) by the driving shaft and rotates the driven shaft through means such as free-wheel couplings or racks and pinion drives, the speed of rotation of the driven shaft being varied by changing the amplitude of movement of the intermediate member.

Transmissions of this kind are known in which the amplitude is varied by shifting the centre of rotation of a lever forming the intermediate member, one end of which is reciprocated by two rollers situated at the front and at the back of an eccentric. However, although these devices achieve oscillation of the lever without the help of any auxiliary devices, nevertheless the speed of rotation of the driven shaft is only approximately constant.

In other drives for control apparatus the amplitude of oscillation of an oscillating intermediate member is varied by means of eccentric cams mounted so as to be axially slidable on the driving shaft, the cams having profiles of variable eccentricity in the axial direction. A roller connected to the oscillating member follows the surface of the roller cam. A spring holds the roller constantly in contact with the surface of the roller cam. Thus the oscillating member is driven in the one direction by the roller cam, and in the other direction by the spring. A positive drive is provided only in the one direction.

With this arrangement there is a risk, particularly at high rotational speeds, that the roller leaves the surface of the cam when the oscillating member changes its direction of movement, with the result that the drive is noisy.

In accordance with the invention, a continuously variable angular speed transmission of the kind described comprises at least one eccentric cam which is rotated by the driving member and which has a continuously variable profile in its axial direction, a number of pairs of rollers which are situated at a fixed distance apart on opposite sides of the cam or cams, so that they are positively constrained to engage and follow the cam or cams at all times, a separate intermediate member carrying each pair of the follower rollers so that the intermediate members perform a to and fro motion out of phase with one another, means coupling the intermediate members to the driven shaft so that the driven shaft is continuously rotated by the to and fro motion of the intermediate members, and means for adjusting the or each cam and its follower rollers relatively to one another in the axial direction of that cam or cams to vary the form of the to and fro motion of the corresponding intermediate member and hence the ratio of the angular speed of the driven member relatively to that of the driving member.

With this arrangement, the torque is always transmitted by positive engagement, and consequently the return stroke of the intermediate member can also be used for transmitting the torque to the driven shaft, and in this way the number of cams and intermediate members can be correspondingly reduced. The oscillating or reciprocating intermediate members may be connected to the driven shaft by free-wheel couplings, or if large torques have to be transmitted then by toothed rack drives.

Some examples of transmissions constructed in accordance with the invention are illustrated in the accompanying drawings in which:

FIGURE 2 is a plan of the FIGURE 1 example;

FIGURE 3 shows the profile of one of the cams of the FIGURE 1 example;

FIGURE 4 is a side elevation, with parts in section, of second example;

FIGURE 5 is an end elevation, with parts in section, of a third example;

Figure 1:
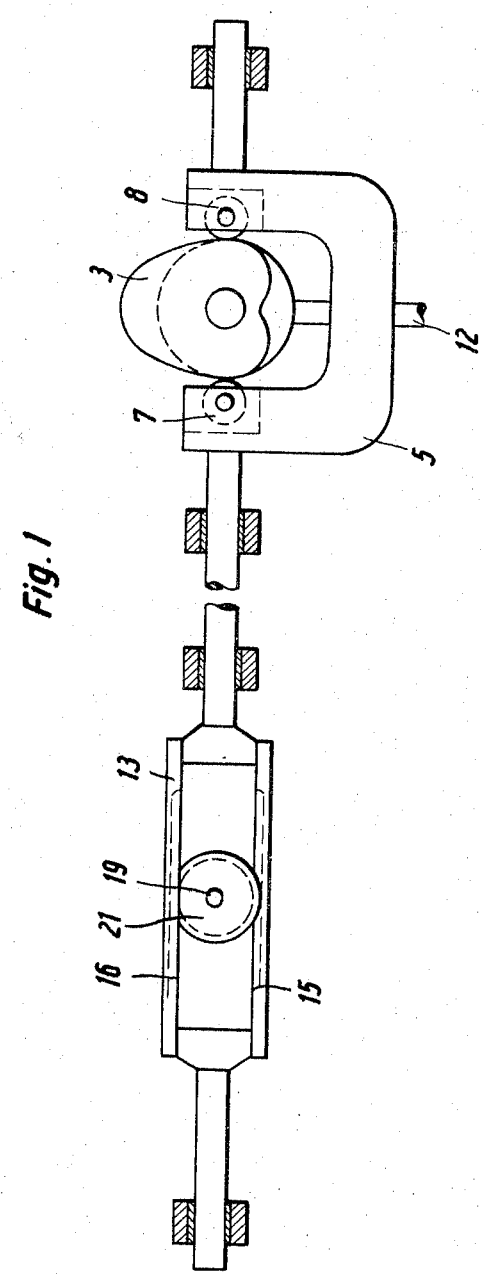
FIGURE 1 is a side elevation of one example as seen on the line A–B in FIGURE 2.

As shown in FIGURES 1 and 2, a driving shaft 2 is mounted to slide axially in a hollow shaft 1, and on the driving shaft 2 there are fixed two cams 3 and 4 whose cam surfaces are constantly in contact with cam follower rollers 7, 8, 9, 10, which rotate in bearings in the two frames 5 and 6. The drive shaft is axially adjustable in position by means of a ring 11 which is free to rotate on the drive shaft and is equipped with a hand lever 12. The frame 5 is itself fixed to an oscillating frame 13, and the frame 6 is similarly fixed to an oscillating frame 14. The two oscillating frames are equipped with toothed racks 15, 16, 17, 18, which engage by means of free-wheel rings with toothed wheels 20, 21, 22, 23 mounted on a driven shaft 19, to the effect that the driven shaft 19 is continuously rotated by the reciprocating movements of the oscillating frames 13 and 14.

The two cams 3 and 4 are the same as each other, but they are mounted on the driving shaft the one rotated through 90° with respect to the other. FIGURE 3 shows the design of a cam of this kind. The cam has a circular cross-section at one end (this corresponds to the lowest position of the driving shaft in FIGURE 2). When the rollers 7, 8, 9, 10 follow this circular cam surface the frames 5 and 6 remain stationary. The other end of the cam (corresponding to the highest possible position of the driving shaft in FIGURE 2) gives the frames 5, 6 the widest oscillating movement. FIGURE 3 illustrates the contour of this end of the cam. Beginning with the horizontal diameter 7, 7', and assuming the cam to be rotating, the diameter is shifted in one direction in proportion to the angle or rotation. In this way there occur the points 6, 5, 4, 3, 2 and 6', 5', 4', 3', 2'. During rotation from 2 towards 1 and from 2' towards 1', the distance through which the diameter is shifted outwards to the greatest distance. From there onwards the diameter is brought back, symmetrically to the other side of the cam, to the point 7'. All other points on the surface of the cam are located on straight lines joining corresponding points of the two extreme contours, that is to say the contours at the two ends of the cam body.

This design of cam has the effect that when the driving shaft rotates clockwise each of the two frames 5, 6, starting out from its central position, first of all moves to the right at uniform speed (the cam follower roller 8, 10 following the contour from the point 7 to the point 2). After that the speed of the frame again decreases and again reaches zero when the roller 8, 10 touches the point 1'. The cycle of movements is repeated. The range of travel of the frame 5, 5' is adjustable between zero and the greatest range by axially sliding the driving shaft by means of the manual lever 12. The drive is transmitted to the driven shaft 19 through the four pinion wheels 20, 21, 22, 23 which are equipped with free-wheel rings.

However in certain cases it can be undesirable to use a free-wheel drive, particularly when large powers are to be transmitted. In these cases the free-wheel transmission can be replaced by a rack rod transmission controlled by cam shafts.

Furthermore there can if desired be used reversible free-wheel couplings between the pinion wheels 20, 21, 22, 23, and the driven shaft 19, so that the direction of rotation of the driven shaft can be reversed although the driving shaft still rotates in the same direction.

If there are used, as shown in FIGURE 2, two cams and two oscillating frames, the angular velocity produced by the movements of the oscillating frames from the right to the left must be kept constant during at least 90° rotation of the driving shaft. The angular velocity can in fact be kept constant through an angle greater than 90°, so that the periods of engagement of the oscillating frames with the driven shaft overlap, giving the driven shaft a continuous drive without shocks.

In the version described above four engagement periods occur during each rotation of the driving shaft. On the other had then drive can of course be so arranged that any desired number of engagement periods during a rotation of the driving shafts. Furthermore, although in FIGURES 1 and 2 the cams are fixed to a slidable driving shaft, it can in certain cases be preferably to slide the oscillating frames 5, 6 (FIGURE 2) axially, leaving the driving shaft axially fixed. This arrangement gives the same result because the same fundamental principle is applied, that is to say the speed ratio is changed by bringing the rollers into contact with the cams at different cam cross-sections.

In the version shown in FIGURES 1 and 2 the oscillating frames reciprocate on straight lines and transmit the drive through rack rods 15, 16, 17, 18 to pinions 20, 21, 22, 23 equipped with free-wheel rings, and so to the driven shaft 19. However, the arrangement can be considerably simplified by using, instead of rack rods and toothed pinion wheels, oscillating levers acting directly on the driven shaft through free-wheel couplings. FIGURE 4 shows a version of this kind. On a driving shaft 24 are fixed two cams 25, 26, together forming a double cam. A cam follower roller 27 rests in contact with the front surface of the cam 25, and a cam follower roller 28 rests in contact with the rear surface of the cam 26. The two cam follower rollers are mounted on pins 29, 30 which rotate in bearings in forked ends 31, 32 of oscillating levers 33, 34, which are themselves fixed to a tubular shaft 36 mounted to rotate freely on a driven shaft 35. The hollow shaft 36 has at its left-hand end a coupling element 37 which engages, when the hollow shaft 36 is pushed axially towards the left by the spring 39, with a coupling element 38 fixed to the driven shaft 35. A cam 40, actuated by the driving shaft 24, disengages the coupling 37, 38 when the levers 33, 34 oscillate in one direction, and allows the coupling to engage when the levers oscillate in the other direction.

In this case, in order to transmit drive to the driven shaft during the whole of a rotation of the driving shaft, it is necessary to provide several double cams and several pairs of oscillating levers with free-wheel couplings, as represented in FIGURE 4, for example three of each. This simple construction is achieved by displacing the oscillating rollers 27, 28 with their supporting levers 33, 34, in the direction of the longitudinal axes 24, 35, and by dividing the cams into two halves 25 and 26, for each of which there is a roller, so that (in contrast to the arrangements of FIGURES 1 and 2, in which the rollers 7 and 8 follow a common path) the rollers 27 and 28 follow separate paths, which are calibrated independently of each other.

The cams 25 and 26 are profiled essentially as shown in FIGURE 3. However in this case allowance must be made for the fact that the cam follower rollers 27 and 28 do not move in straight lines but follow circular arcs in their oscillating movements.

Furthermore, instead of using three double cams mounted in series on the driving shaft, there can be three pairs of levers mounted on three driven shafts spaced at 120° and rotating in bearings in the walls of the housing, and driving a common final driven shaft through gear-wheels. An arrangement of this kind is particularly advantageous when it is desired to provide a drive of the least possible overall length.

On the other hand the arrangement shown in FIGURE 4, using for example three double cams mounted on the driving shaft 24, can be developed to provide an arrangement offering special advantages. A second driven shaft acn be added above the driving shaft 24 in a position symmetrical to the driven shaft 35. This second driven shaft can be added above the driving shaft 24 in shaft 35, that is to say the driving shaft 24 can be used to drive two driven shafts at different speeds. In this case the driving shaft is axially fixed, and the speeds of the driven shafts can be adjusted individually by shifting the axial positions of the oscillating levers.

Alternatively the two halves of the double cam can if desired be mounted on two separate driving shafts, as shown in FIGURE 5, the two driving shafts being driven, for example through gear-wheels, by a common primary driving shaft. On the shaft 41 is mounted the cam 25, and on the shaft 42 the cam 26. The surfaces of these cams are followed by rollers 45, 46, 47, 48, mounted on the ends of rocking levers 43, 44. The rocking lever 43 drives the driven shaft 49 and the rocking lever 44 drives the driven shaft 50. Here again the two shafts can be driven at different speeds by adjusting the two driven shafts. In a drive of this kind there are mounted on each driving shaft three cams in series, mounted on their shafts at angles of 120° with respect to the cams 25 and 26. On the driven shaft 49 there are mounted three rocking levers similar to the lever 43, and on the driven shaft 50 three rocking levers corresponding to the lever 44. The rocking levers are connected to the driven shafts through free-wheel couplings. Of the cams and rocking levers, mounted in series behind each other, FIGURE 5 shows only the forward pair.

Figure 6:
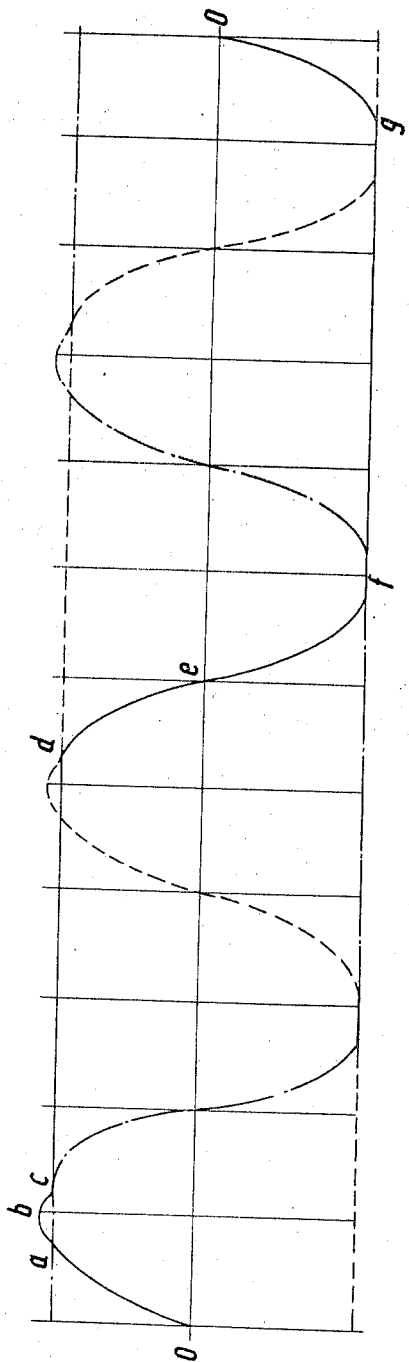
FIGURE 6 is an explanatory graph.

In the example described above the movements of the rocking levers are transmitted to the driven shaft through one-way couplings. However the known devices of this kind have the disadvantage that when the coupling engages there is a slack angle which must be taken up before full engagement of the coupling, and during this period the speed of the driven shaft temporarily decreases, so that the torque is not transmitted without a certain amount of shock. To prevent this effect it is desirable to allow the speed of rotation of the rocking lever to exceed that of the driven shaft just before full engagement of the coupling. The behaviour of the rocking lever speeds is represented in FIGURE 6, for a drive using three double cams and three rocking levers. In this curve the ordinate represents rotational speed, and the abscissa measures time, or measures the angle of rotation of the driving shaft. The full line represents the speed of the first rocker, the broken line the speed of the second rocker and the dash-dot line the speed of the third rocker. At the beginning of the rotation the coupling claw of the third rocker is engaged with the driven shaft (the uppermost line). The speed of the first rocker increases from zero to something more than the speed of the driven shaft and then decreases, during engagement of the claw, down to the speed of the driven shaft (the part of the curve 0–a–b–c). After that the first rocker drives the driven shaft until the instant $d$. Here the driving processes overlap for a short interval. After $d$ the speed of the first rocker decreases to zero, at the instant $e$, whereupon the first rocker changes its direction of rotation and accelerates on its return stroke, reaching terminal speed at $f$ and then continuing to rotate at terminal speed until the instant $g$, when its speed of rotation again derceases towards zero, whereupon the cycle begins again.

Figure 7:
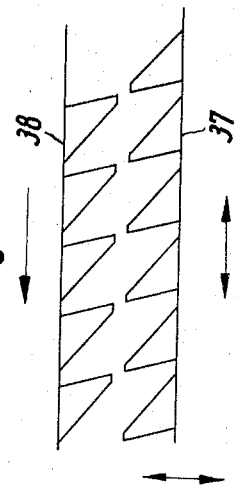
FIGURE 7 is a detail of a clutch for use between an intermediate member and a driven shaft.

This speed curve can be obtained by suitably profiling the cams. FIGURE 7 shows diagrammatically the development of the one-way coupling of FIGURE 4, showing the sloping teeth. The claw 37 engages with the claw 38 when the hollow shaft 36 slides from the right towards the left, and disengages when the hollow shaft 36 slides from the left towards the right. This movement of the hollow shaft 36 necessarily produces the speed curves shown in FIGURE 6, because the shifting of the rollers 27 and 28 axially along the cams 25 and 26 varies the amplitude and speed of the rocking movements of the levers 33 and 34. When the hollow shaft 36 slides towards the left, engaging the coupling, the rockers 33 and 34 rotate at slower speeds and consequently the driven claw 38 also rotates more slowly. As a result of this effect, and without the help of any auxiliary devices, the oscillating movements of the rocking levers 33, 34, under the influence of the spring 39, produce a velocity curve as shown in FIGURE 6 and the coupling claws 37 and 38 engage without shock.

The examples described above show that the inventive thought can take the form of a number of different versions and has many different applications. Drives of this kind are particularly useful in the technology of control devices, for example in those applications where either the driving shaft or the driven shaft must always rotate at constant speed.

What I claim is:

1. A continuously variable angular speed transmission of the kind described, the transmission comprising at least one eccentric cam which is rotated by the driving member and which has a continuously variable profile in its axial direction, a number of pairs of rollers which are situated at a fixed distance apart on opposite sides of the cam or cams, so that they are positively constrained to engage and follow the cam or cams at all times, a separate intermediate member carrying each pair of the follower rollers so that the intermediate members perform a to and fro motion out of phase with one another, means coupling the intermediate members to the driven shaft so that the driven shaft is continuously rotated by the to and fro motion of the intermediate members, and means for adjusting the or each cam and its follower rollers relatively to one another in the axial direction of that cam or cams to vary the form of the to and fro motion of the corresponding intermediate member and hence the ratio of the angular speed of the driven member relatively to that of the driving member.

2. A transmission according to claim 1, in which the follower rollers of each pair are mounted on an intermediate member formed by separate levers which oscillate together on the driven shaft and engage two independent tracks on the two halves of a correspondingly profiled double cam, the rollers being axially offset along the rotary axis of that cam.

3. A transmission according to claim 2, in which there are three pairs of levers carrying follower rollers, each pair of levers being mounted on a separate driven shaft but the three pairs of follower rollers all following a common double cam.

4. A transmission according to claim 2, in which the two halves of the double cam are mounted on separate driving shafts which are both driven from a common primary driving shaft.

5. A transmission according to claim 1, in which several driven shafts are driven from separate cams mounted on a common shaft, so that the rotational speeds of the driven shafts can be adjusted independently of one another.

6. A transmission according to claim 1, in which the motion of an intermediate member drives the driven member through a one way coupling having driving and driven parts, means being provided for a temporary increase the speed of the driving part immediately before the drive is taken up through that one way coupling in order to avoid mechanical shocks and to ensure that the speed of rotation of the driven shaft remains constant during the changeover of the drive from one intermediate member to another.

References Cited

UNITED STATES PATENTS

| 1,014,706 | 1/1912 | Houghton | 74—422 |
| 1,559,962 | 11/1925 | Heinitz | 74—55 |
| 2,912,100 | 11/1959 | Logan | 74—55 |

FOREIGN PATENTS 412,029  9/1945  Italy.

FRED C. MATTERN, *Primary Examiner.*

WESLEY S. RATLIFF, *Assistant Examiner.*

U.S. Cl. X.R.

74—29